US008761410B1

(12) United States Patent
Avendano et al.

(10) Patent No.: US 8,761,410 B1
(45) Date of Patent: Jun. 24, 2014

(54) SYSTEMS AND METHODS FOR MULTI-CHANNEL DEREVERBERATION (75) Inventors: Carlos Avendano, Campbell, CA (US); Carlo Murgia, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 453 days.

(21) Appl. No.: 12/963,497

(22) Filed: Dec. 8, 2010

Related U.S. Application Data (60) Provisional application No. 61/373,209, filed on Aug. 12, 2010.

(51) Int. Cl.
H04B 3/20 (2006.01)

(52) U.S. Cl.
USPC ............ 381/66; 381/17; 381/27; 381/61; 381/62; 381/63; 381/309; 381/58; 381/59; 381/71.12; 381/94.4; 704/203; 704/204; 704/205; 704/226; 704/228; 704/260; 704/270; 704/233

(58) Field of Classification Search
USPC ......... 381/17, 27, 61, 62, 63, 309, 58, 59, 66; 704/205, 233, 260, 270, 226, 228, 704/203–204
See application file for complete search history.

(56) References Cited

U.S. PATENT DOCUMENTS

| | | | | |
|---|---|---|---|---|
| 4,066,842 A | * | 1/1978 | Allen | 381/66 |
| 5,774,562 A | * | 6/1998 | Furuya et al. | 381/66 |
| 7,257,231 B1 | * | 8/2007 | Avendano et al. | 381/99 |
| 8,107,631 B2 | * | 1/2012 | Merimaa et al. | 381/1 |
| 8,160,262 B2 | * | 4/2012 | Buck et al. | 381/66 |
| 8,275,610 B2 | * | 9/2012 | Faller et al. | 704/225 |
| 2009/0043570 A1 | * | 2/2009 | Fukuda et al. | 704/211 |
| 2009/0248403 A1 | * | 10/2009 | Kinoshita et al. | 704/219 |
| 2010/0198593 A1 | * | 8/2010 | Yu | 704/233 |
| 2013/0066628 A1 | * | 3/2013 | Takahashi | 704/226 |

OTHER PUBLICATIONS

Hioka et al, Estimating Direct to Reverberant energy ratio based on spatial correlation model segregating direct sound and reverberation, IEEE, Conference Mar. 14-19, 2010.*
Avendano et al, Study on dereverberation of speech based on temporal envelope filtering, IEEE, Oct. 1996.*
Usher et al, enhancement of spatial sound quality a new reverberation extraction audio upmixer,IEEE,2007.*

* cited by examiner

*Primary Examiner* — Davetta W Goins
*Assistant Examiner* — Kuassi Ganmavo
(74) *Attorney, Agent, or Firm* — Carr & Ferrell LLP (57) ABSTRACT

The present technology provides robust, high quality dereverberation of an acoustic signal which can overcome or substantially alleviate the problems associated with the diverse and dynamic nature of the surrounding acoustic environment. The present technology utilizes acoustic signals received from a plurality of microphones to carry out a multi-faceted analysis which accurately identifies reverberation based on the correlation between the acoustic signals. Due to the spatial distance between the microphones and the variation in reflection paths present in the surrounding acoustic environment, the correlation between the acoustic signals can be used to accurately determine whether portions of one or more of the acoustic signals contain desired speech or undesired reverberation. These correlation characteristics are then used to generate signal modifications applied to one or more of the received acoustic signals to preserve speech and reduce reverberation.

15 Claims, 5 Drawing Sheets

SYSTEMS AND METHODS FOR MULTI-CHANNEL DEREVERBERATION

CROSS-REFERENCE TO RELATED APPLICATIONS

This application claims the benefit of U.S. Provisional Application No. 61/373,209, filed on Aug. 12, 2010, entitled "Multi-Channel Dereverb", which is incorporated by reference herein.

BACKGROUND

1. Field of the Invention

The present invention relates generally to audio processing, and more particularly to techniques for reducing reverberation within an acoustic signal.

2. Description of Related Art

Various types of teleconferencing and other hands-free audio devices can suffer from the problem of acoustic reverberation. Reverberation is a delayed and distorted version of an original sound caused by acoustic reflections within the environment surrounding the audio device.

A listener present within the same environment as uttered original speech is generally able to adequately differentiate the original speech from reverberation. However, when captured by a microphone and converted into an electrical signal such as for playback to a remote listener, the reverberation can add significant distortion. When present in the electrical signal, it is difficult for the remote listener to separate the original speech from the reverberation. As a result, the remote listener will hear the original speech, along with a delayed and distorted version of the speech, which reduces intelligibility of the electrical signal and interferes with normal communication.

One attempt at reducing reverberation involves predicting the amount of reverberation based on an estimate of the acoustic environment surrounding the audio device. Typically, this estimate utilizes a transfer function which models the impulse response of the surrounding acoustic environment. Reverberation reduction (referred to herein as dereverberation) is then performed through deconvolution (inverse filtering), whereby the electrical signal is filtered based on the transfer function.

Errors in dereverberation can occur due to the difficulty in forming a transfer function which accurately models the surrounding acoustic environment. Specifically, since the surrounding acoustic environment is rarely fixed, the location and number of sources of reflections are constantly changing. If the transfer function used to model the impulse response of the surrounding acoustic environment is even slightly correct, residual reverberation will remain within the electrical signal. The residual reverberation can interfere with the listening experience, and is annoying. In some instances, errors in the transfer function may result in an increase in the distortion of the electrical signal, rather than a decrease.

It is therefore desirable to provide systems and methods for increasing the quality and robustness of dereverberation in diverse acoustic environments.

SUMMARY

The present technology provides robust, high quality dereverberation of an acoustic signal which can overcome or substantially alleviate the problems associated with the diverse and dynamic nature of the surrounding acoustic environment. The present technology utilizes acoustic signals received from a plurality of microphones to carry out a multifaceted analysis which accurately identifies reverberation based on the correlation between the acoustic signals. Due to the spatial distance between the microphones and the variation in reflection paths present in the surrounding acoustic environment, the correlation between the acoustic signals can be used to accurately determine whether portions of one or more of the acoustic signals contain desired speech or undesired reverberation. These correlation characteristics are then used to generate signal modifications applied to one or more of the received acoustic signals to preserve speech and reduce reverberation.

A method for reducing reverberation within an acoustic signal as described herein includes receiving a first acoustic signal and a second acoustic signal. An energy level of a reverberation component in the first acoustic signal is then determined based on a correlation between the first and second acoustic signals. A signal modification is then applied to the first acoustic signal to reduce the energy level of the reverberation component. The signal modification is based on the determined energy level of the reverberation component.

A system for reducing reverberation within an acoustic signal as described herein includes a first microphone to receive a first acoustic signal and a second microphone to receive a second acoustic signal. The system also includes an audio processing module to determine an energy level of a reverberation component in the first acoustic signal based on a correlation between the first and second acoustic signals. The audio processing module further applies a signal modification to the first acoustic signal to reduce the energy level of the reverberation component. The signal modification is based on the determined energy level of the reverberation component.

A computer readable storage medium as described herein has embodied thereon a program executable by a processor to perform a method for reducing reverberation within an acoustic signal as described above.

Other aspects and advantages of the present invention can be seen on review of the drawings, the detailed description, and the claims which follow.

DETAILED DESCRIPTION

The present technology provides robust, high quality dereverberation of an acoustic signal which can overcome or substantially alleviate the problems associated with the diverse and dynamic nature of the surrounding acoustic environment. The present technology utilizes acoustic signals received from a plurality of microphones to carry out a multifaceted analysis which accurately identifies reverberation based on the correlation between the acoustic signals. Due to the spatial distance between the microphones and the variation in reflection paths present in the surrounding acoustic environment, the correlation between the acoustic signals can be used to accurately determine whether portions of one or more of the acoustic signals contain desired speech or undesired reverberation. These correlation characteristics are then used to generate signal modifications applied to one or more of the received acoustic signals to preserve speech and reduce reverberation.

Embodiments of the present technology may be practiced on any audio device that is configured to receive and/or provide audio such as, but not limited to, cellular phones, phone handsets, headsets, and conferencing systems. While some embodiments of the present technology will be described in reference to operation on a cellular phone, the present technology may be practiced on any audio device.

Figure 1:
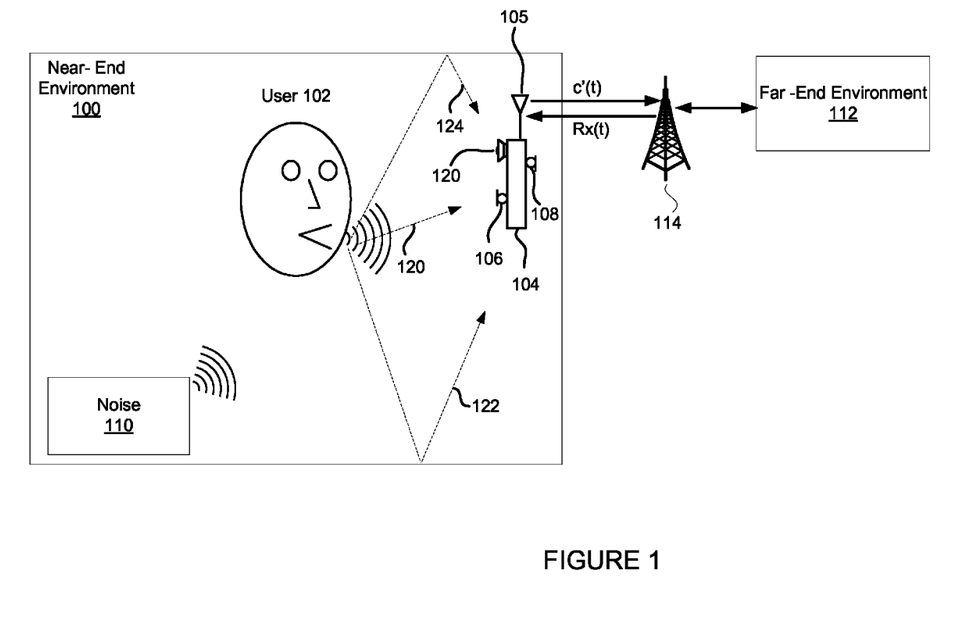
FIG. 1 is an illustration of an environment in which embodiments of the present technology may be used.

FIG. 1 is an illustration of an environment in which embodiments of the present technology may be used. A user 102 in a near-end environment 100 may act as an acoustic (speech) source to an audio device 104. The exemplary audio device 104 includes a primary microphone 106, a secondary microphone 108, and an audio processing system (not illustrated in FIG. 1) to perform noise and reverberation reduction using the techniques described herein. In some embodiments, the audio device 104 may include more than two microphones, such as for example three, four, five, six, seven, eight, nine, ten or even more microphones. The primary microphone 106, the secondary microphone 108 and any additional microphones may be omni-directional microphones. Alternative embodiments may utilize other forms of microphones or other acoustic sensors.

As shown in FIG. 1, the microphones 106 and 108 may receive sound from the user 102 (or other desired speech source) via a direct path 120 between the user 102 and the audio device 104. The sound provided by the user 102 or other desired speech source and received by one or more of the microphones 106 and 108 via the direct path 120 is referred to herein as a direct speech component.

In addition, the microphones 106 and 108 may receive sound from the user 102 via one or more reflection paths 122, 124 within the near-end environment 100 surrounding the audio device 104. These reflection paths 122, 124 may be caused by objects such as walls as well as or other sources of acoustic reflection. These sources of reflection may be stationary, non-stationary, and/or a combination of both stationary and non-stationary reflection sources. The sound from the user 102 or other desired speech source which is received by one or more of the microphones 106 and 108 via the reflection paths 122, 124 is referred to herein as reverberation. Although two reflection paths 122, 124 are shown in FIG. 1, it will be understood that the number of reflection paths within the near-end environment 100 may be different from two.

While the microphones 106 and 108 receive sound (i.e. acoustic signals) from the user 102, the microphones 106 and 108 also pick up noise 110. Although the noise 110 is shown coming from a single location in FIG. 1, the noise 110 may include any sounds from one or more sources that differ from the user 102. The noise 110 may be stationary, non-stationary, and/or a combination of both stationary and non-stationary noise.

The total signal received by the primary microphone 106 is referred to herein as the first acoustic signal c(t). The first acoustic signal c(t) may be represented as a superposition of a direct speech component received via the direct path 120 from the user 102, a reverberation component received via one or more reflection paths 122, 124 from the user 102, and a noise component received from noise 110.

The total signal received by the secondary microphone 108 is referred to herein as the second acoustic signal f(t). Due to the spatial separation of the primary microphone 106 and the secondary microphone 108, the speech component from the user 102 received via the direct path 120 by the secondary microphone 108 may have an amplitude difference and a phase difference relative to the speech component received by the primary microphone 106. Similarly, the noise component received from noise 110 by the secondary microphone 108 may have an amplitude difference and a phase difference relative to the noise component received by the primary microphone 106. In addition, the reverberation component received by the secondary microphone 108 via one or more reflection paths 122, 124 may have an amplitude difference and a phase difference relative to the reverberation component received by the primary microphone 106.

The audio device 104 processes the first acoustic signal c(t) and the second acoustic signal f(t) to remove or reduce reverberation and noise using the techniques described herein. A noise and reverberation reduced acoustic signal c'(t) may then be transmitted via an antenna device 105 over a communications network 114 to a far-end environment 112. The acoustic signal c'(t) may then for example be presented for playback to a remote person in the far-end environment 112 via a second audio device. The acoustic signal c'(t) may also or alternatively be stored in memory within the audio device 104, and may be subsequently presented for playback to the user 102 via a direct path 120 or a headset (not shown).

As shown in FIG. 1, the audio device 104 also receives a far-end acoustic signal Rx(t) wirelessly received over the communications network 114 via the antenna device 105. The far-end acoustic signal Rx(t) may for example comprise speech from the far-end environment 112, such as speech of the remote person talking into the second audio device.

As described below, the reverberation within the first acoustic signal c(t) (and/or the second acoustic signal f(t)) is derived based on the correlation between the first acoustic signal c(t) and the second acoustic signal f(t). Specifically, the correlation is used to identify the portions of the first acoustic signal c(t) that contain speech and those which contain reverberation and/or noise.

As shown in FIG. 1, the microphones 106 and 108 both receive sound via the direct path 120 between the user 102 and the audio device 104. As a result, the difference between the intensity level and time of arrival of the sound received via the direct path 120 at the first and second (primary and secondary) microphones 106 and 108 will be relatively insensitive to the surrounding near-end environment 100. This results in a relatively high correlation between the speech components in the first and second acoustic signals c(t) and f(t). In other words, the correlation between the first and second acoustic signals c(t) and f(t) will be relatively high when the first and second acoustic signals c(t) and f(t) are dominated by sound received via the direct path 120.

In contrast, the difference between the intensity level and time of arrival of the sound received via the reflection paths 122, 124 at the first and second microphones 106 and 108 will be relatively sensitive to the surrounding near-end environment 100, since the reflection paths 122, 124 are rarely fixed. This results in a relatively low correlation between the reverberation components in the first and second acoustic signals c(t) and f(t). In other words, the correlation between the first and second acoustic signals c(t) and f(t) will be relatively low when the first and second acoustic signals c(t) and f(t) are dominated by sound received via the reflection paths 122, 124.

This large dissimilarity in the correlation due to speech and reverberation enables a highly accurate determination of whether a portion of the first acoustic signal c(t) is speech or reverberation.

Figure 2:
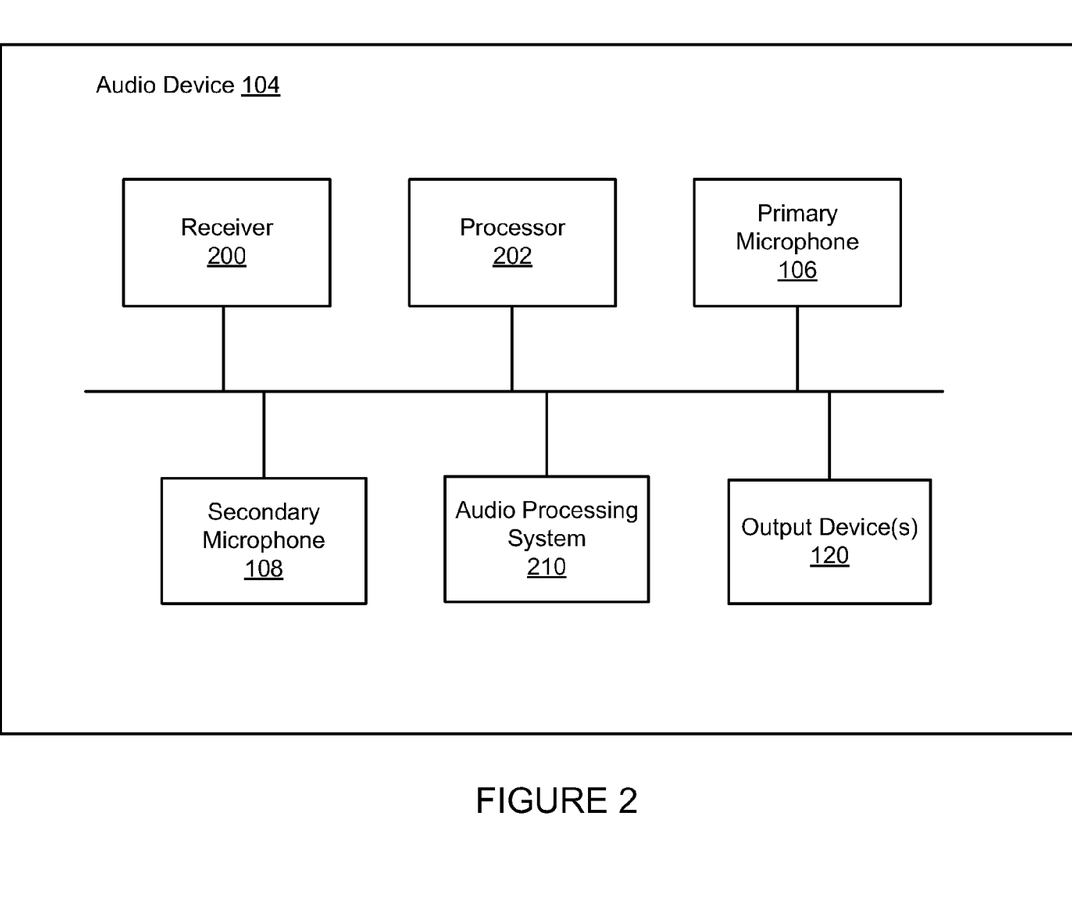
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, the secondary microphone 108, an audio processing system 210, and an output device such as direct path 120. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including reducing reverberation within an acoustic signal as described herein. Processor 202 may include hardware and software implemented as a processing unit, which may process floating point operations and other operations for the processor 202.

The exemplary receiver 200 is configured to receive the far-end acoustic signal Rx(t) from the communications network 114 and transmit a signal c'(t) to the communications network. In the illustrated embodiment the receiver 200 includes the antenna device 105.

The audio processing system 210 receives the acoustic signals from the microphones 106 and 108, and processes the signals. This processing includes reducing reverberation as described herein. The audio processing system 210 is discussed in more detail below.

Figure 3:
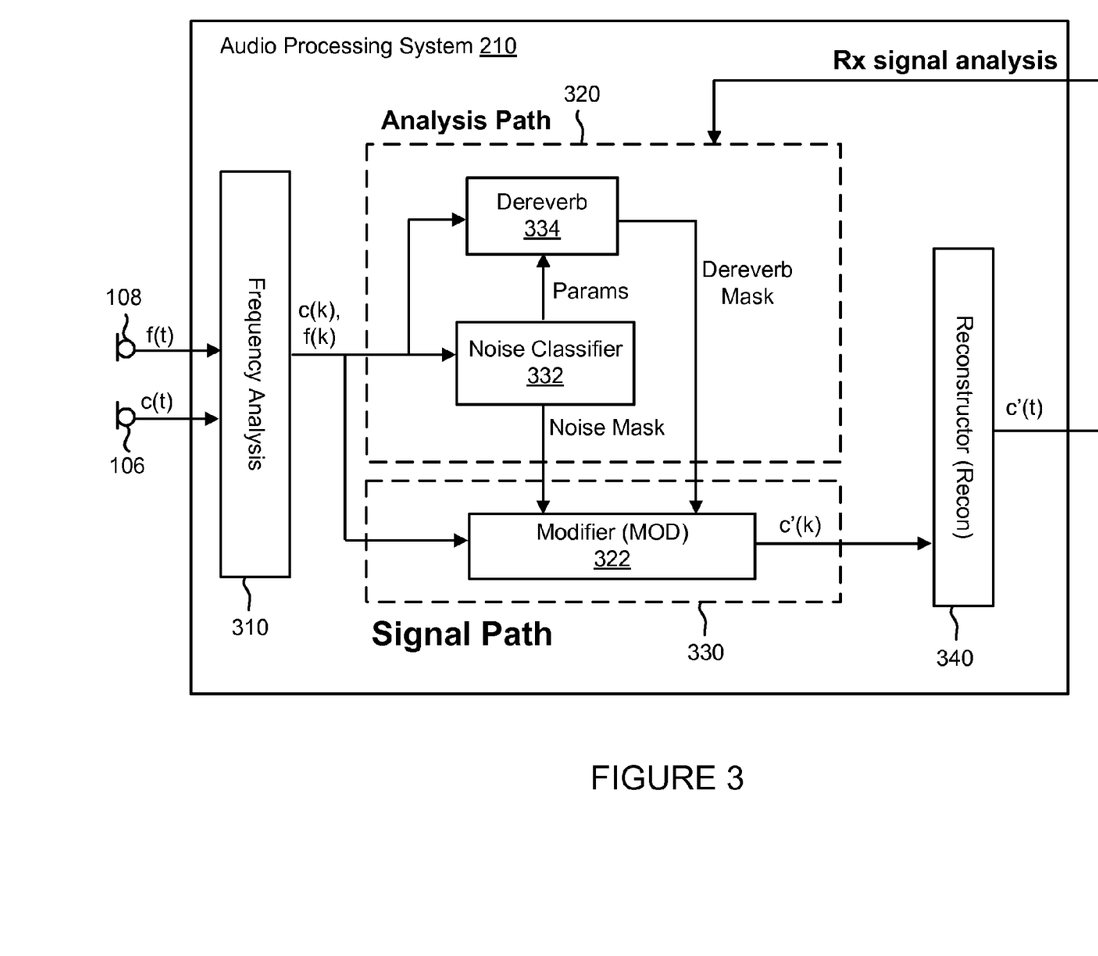
FIG. 3 is a block diagram of an exemplary audio processing system for reducing reverberation within an acoustic signal.

FIG. 3 is a block diagram of an exemplary audio processing system 210 for reducing reverberation within an acoustic signal as described herein. In the following discussion, the dereverberation techniques described herein will be carried out on the first acoustic signal c(t) to form a noise and reverberation reduced acoustic signal c'(t). It will be understood that the described herein can also or alternatively be carried out on the second acoustic signal f(t).

In exemplary embodiments, the audio processing system 210 is embodied within a memory device within the audio device 104. The audio processing system 210 may include frequency analysis module 310, dereverb module 334, noise classifier module 332, modifier module 322, and reconstructor module 340. Audio processing system 210 may include more or fewer components than those illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number and type of signals communicated between modules.

In operation, the first acoustic signal c(t) received from the primary microphone 106 and the second acoustic signal f(t) received from the secondary microphone 108 are processed through frequency analysis module 310.

In one embodiment, the frequency analysis module 310 takes the acoustic signals and mimics the frequency analysis of the cochlea (e.g., cochlear domain), simulated by a filter bank, for each time frame. The frequency analysis module 310 separates each of the first acoustic signal c(t) and the second acoustic signal f(t) into two or more frequency sub-band signals. A sub-band signal is the result of a filtering operation on an input signal, where the bandwidth of the filter is narrower than the bandwidth of the signal received by the frequency analysis module 310. Alternatively, other filters such as short-time Fourier transform (STFT), sub-band filter banks, modulated complex lapped transforms, cochlear models, wavelets, etc., can be used for the frequency analysis and synthesis.

Because most sounds (e.g. acoustic signals) are complex and include multiple components at different frequencies, a sub-band analysis on the acoustic signal is useful to separate the signal into frequency bands and determine what individual frequency components are present in the complex acoustic signal during a frame (e.g. a predetermined period of time). For example, the length of a frame may be 4 ms, 8 ms, or some other length of time. In some embodiments there may be no frame at all. The results may include sub-band signals in a fast cochlea transform (FCT) domain. The sub-band frame signals of the first acoustic signal c(t) are expressed as c(k), and the sub-band frame signals of the second acoustic signal f(t) are expressed as f(k). The sub-band frame signals c(k) and f(k) may be time and sub-band dependent, and may vary from one frame to the next.

The sub-band frame signals c(k) and f(k) are provided from frequency analysis module 310 to an analysis path sub-system 320 and to a signal path sub-system 330. The analysis path sub-system 320 may process the sub-band frame signals to identify signal features, distinguish between speech components, noise components, and reverberation components, and generate one or more signal modifiers. The signal path sub-system 330 is responsible for modifying the sub-band frame signals c(k) by applying the one or more signal modifiers, such as one or more multiplicative gain masks and/or subtractive operations generated in the analysis path sub-system 320. The modification may reduce noise and reverberation to preserve desired speech components in the sub-band signals. The analysis path sub-system 320 is discussed in more detail below.

Signal path sub-system 330 includes modifier module 322. The modifier module 322 receives the sub-band frame signals c(k) from the frequency analysis module 310. Using the techniques described herein, the modifier module 322 multiplies the sub-band frame signals c(k) with dereverb and noise masks provided by the analysis path sub-system 320. Applying the dereverb and noise masks reduces the energy levels of reverberation and noise components in the sub-band frame signals c(k) to form masked sub-band frame signals c'(k).

The signal path sub-system 330 may also include a noise canceller module to subtract (i.e. cancel) a noise component from one or more of the sub-band signals c(k) prior to the modifier module 322. The noise cancellation module can provide noise cancellation for two-microphone configurations, for example based on source location, by utilizing a subtractive algorithm. By performing noise cancellation with little to no voice quality degradation, the noise canceller module may increase the speech-to-noise ratio (SNR) in sub-band signals received from the frequency analysis module 310 and provided to the modifier module 322 and post filtering modules.

An example of noise cancellation performed in some embodiments by the noise cancellation module is disclosed in U.S. patent application Ser. No. 12/215,980, entitled "System and Method for Providing Noise Suppression Utilizing Null Processing Noise Subtraction," filed Jun. 30, 2008, U.S. patent application Ser. No. 12/422,917, entitled "Adaptive Noise Cancellation," filed Apr. 13, 2009, and U.S. patent application Ser. No. 12/693,998, entitled "Adaptive Noise Reduction Using Level Cues," filed Jan. 26, 2010, the disclosures of which each are incorporated by reference.

Reconstructor module 340 may convert the masked sub-band frame signals c'(k) from the cochlea domain back into the time domain to form a synthesized time domain noise and reverberation reduced acoustic signal c'(t). The conversion may include adding the masked frequency sub-band signals and may further include applying gains and/or phase shifts to the sub-band signals prior to the addition. Once conversion to the time domain is completed, the synthesized time-domain acoustic signal c'(t), wherein the noise and reverberation have been reduced, may be provided to a codec for encoding and subsequent transmission by the audio device 104 to the far-end environment 112 via the communications network 114.

In some embodiments, additional post-processing of the synthesized time-domain acoustic signal may be performed. For example, comfort noise generated by a comfort noise generator may be added to the synthesized acoustic signal prior to encoding and transmitting the signal. Comfort noise may be a uniform constant noise that is not usually discernable to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the analysis path sub-system 320 may have access to the level of comfort noise in order to generate gain masks that will suppress the noise and/or reverberation to a level at or below the comfort noise.

The noise classifier module 332 receives the sub-band frame signals c(k) and f(k) provided by the frequency analysis module 310. The noise classifier module 332 is responsible for analyzing the sub-band frame signals c(k) and f(k) to determine which sub-band frame signals c(k) are dominated by speech/reverberation and noise when adapting speech and noise models. The noise classifier module 332 then derives a noise mask based on the speech and noise models.

The noise classifier module 332 may compute frame energy estimations of the sub-band frame signals, as well as various spatial cues such as sub-band inter-microphone level difference (sub-band ILD(k)) between the sub-band signals c(k) and the f(k) in each sub-band, sub-band inter-microphone time differences (sub-band ITD(k)) and inter-microphone phase differences (sub-band IPD(k)) between the sub-band signals c(k) and the f(k) in each sub-band. The noise classifier module 332 may also compute monaural or binaural features which may be required by other modules, such as pitch estimates and cross-correlations between microphone signals. The noise classifier module 332 may provide both inputs to and process outputs from signal path sub-system 330.

Determining energy levels and ILDs is discussed in more detail in U.S. patent application Ser. No. 11/343,524, entitled "System and Method for Utilizing Inter-Microphone Level Differences for Speech Enhancement", and U.S. patent application Ser. No. 12/832,920, entitled "Multi-Microphone Robust Noise Suppression", the disclosures of which each are incorporated by reference.

The noise classifier module 332 may process the frame energy estimations to compute noise estimates and may derive models of the noise and speech/reverberation in the sub-band signals. The noise classifier module 332 then derives a noise mask based on the speech/reverberation and noise models. The noise mask is provided to the modifier module 322 to reduce the energy level of the noise components in the primary sub-band frame signals c(k). The values of the noise mask output from the noise classifier module 332 may be time and sub-band dependent and may be derived so as to optimize noise reduction on a per sub-band basis.

In some embodiments, the noise mask may be based on Wiener filter gain mask values. The noise mask values may be based on the noise short-term power spectral density and a sub-band power spectral density during time frame t and sub-band signal index k. This can be represented mathematically as:

$$G_{wf}(t, k) = \frac{P_s(t, k)}{P_s(t, k) + P_n(t, k)}$$

where $P_s$ is the estimated power spectral density of speech/reverberation in the sub-band signal k of the primary acoustic signal during time frame t, and $P_n$ is the estimated power spectral density of the noise in the sub-band signal k of the first acoustic signal during time frame t.

In embodiments, the noise mask may be lower bounded such that the energy level of the noise component in the sub-band signal may be reduced to no less than a residual target level, which may be fixed or slowly time-varying. In some embodiments, the residual target level is the same for each sub-band signal. Such a target level may be a level at which the noise component ceases to be audible or perceptible, below a self-noise level of a microphone used to capture the primary acoustic signal, or below a noise gate of a component such as an internal AGC noise gate or baseband noise gate within a system implementing the noise and reverberation reduction techniques described herein.

Dereverb module 334 receives the sub-band frame signals c(k) and f(k) provided by the frequency analysis module 310. The dereverb module 334 also receives noise reduction parameters Params from the noise classifier module 332. The noise reduction parameters Params indicate characteristics of the speech/reverberation and noise components within the sub-band frame signals c(k), including the energy levels of the speech/reverberation and noise components. The values of the parameters Params may be time and sub-band signal dependent.

As described below, the dereverb module 334 uses the parameters Params to derive values of a dereverb mask based on the energy level of the reverberation component within a corresponding sub-band signal c(k). The dereverb mask is the provided to the modifier module 322, which applies the dereverb mask to the sub-band signals c(k) to reduce the energy level of the reverberation components. The values of the dereverb mask may be time and sub-band signal dependent and may be derived so as to optimize dereverberation on a per sub-band basis.

The parameters Params provided by the frequency analysis module 310 include a cross-transfer function Xps(k) that maps the sub-band signals c(k) to the sub-band signals f(k) for each sub-band. The dereverb module 334 uses the correlation indicated by the values of the cross-transfer function Xps(k) to determine the energy level of reverberation within the sub-band signals c(k) and thus to determine the values of the dereverb mask. Specifically, the correlation is used to identify the sub-band signals c(k) that contain reverberation in a particular frame.

For example, as described above, the correlation between the sub-band signals c(k) and f(k) will be relatively high when a sub-band signal c(k) is dominated by sound received via the direct path 120. In other words, the correlation is relatively high if the sub-band signal c(k) is dominated by the speech component. In contrast, the correlation will be relatively low when a sub-band signal c(k) is dominated by sound received via the reflection paths 122, 124. In other words, the correlation is relatively low if the sub-band signal c(k) is dominated by the reverberation component.

The parameters Params also include an energy level estimate $E_{pri}(k)$ of the sub-band signals c(k). Determining energy level estimates is discussed in more detail in U.S. patent application Ser. No. 11/343,524, entitled "System and Method for Utilizing Inter-Microphone Level Differences for Speech Enhancement", which is incorporated by reference herein.

Figure 4:
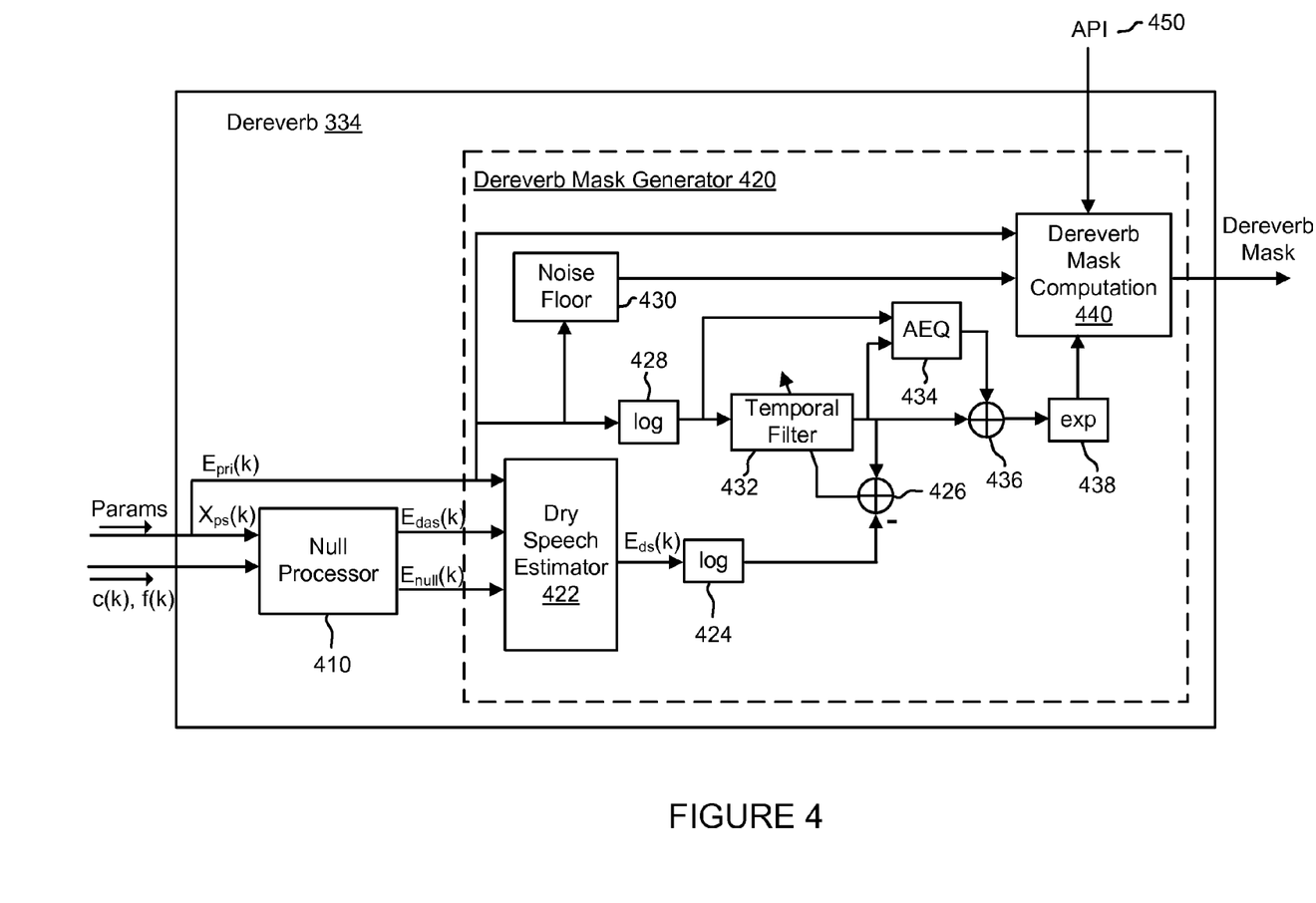
FIG. 4 is a block diagram of an exemplary dereverberation module.

FIG. 4 is a block diagram of an exemplary dereverb module 334. The dereverb module 334 may include a null processor module 410 and a dereverb mask generator 420. The dereverb module 334 may include more or fewer components than those illustrated in FIG. 4, and the functionality of modules may be combined or expanded into fewer or additional modules.

The null processor module 410 receives the sub-band signals c(k) and f(k). The null processor module 410 also receives the cross-transfer function Xps(k) from the noise classifier module 332. The null processor module 410 forms a noncorrelation signal $E_{null}(k)$ by suppressing the portion of the sub-band signals c(k) correlated with the sub-band signals f(k). This can be expressed mathematically as:

$$E_{null}(k) = c(k) - Xps(k) * f(k)$$

By suppressing the correlated portion of the sub-band signal c(k), the noncorrelation signal $E_{null}(k)$ indicates a relative energy level of the reverberation component within the sub-band signals c(k).

The null processor module 410 also forms a correlation signal $E_{das}$ based on the correlated portion of the sub-band signals c(k). In the illustrated embodiment, this can be expressed mathematically as:

$$E_{das}(k) = c(k) + Xps(k) * f(k)$$

The correlation signal $E_{das}$ thus indicates a relative energy level of the speech component within the sub-band signals c(k).

Dry speech estimator 422 within the dereverb mask generator 420 receives the noncorrelation signal $E_{null}(k)$, the correlation signal $E_{das}(k)$, and energy level estimate $E_{pri}(k)$ of the sub-band signals c(k). The dry speech estimator 422 computes the speech component energy $E_{ds}(k)$ within the sub-band signals c(k) based on a difference between the noncorrelation signal $E_{null}(k)$ and the correlation signal $E_{das}(k)$.

In the illustrated embodiment, the dry speech estimator 422 first computes a direct-to-late reverberation ratio (DLRR(k)) based on a ratio of the noncorrelation signal $E_{null}(k)$ and the correlation signal $E_{das}(k)$. In the illustrated embodiment this is represented mathematically as:

$$DLRR(k) = [E_{das}(k)/E_{null}(k)] - 1$$

The DLRR is then used to generate an estimate of the speech component energy $E_{ds}(k)$ by thresholding the DLRR (k) and comparing the energy level $E_{pri}(k)$ of the sub-band signal c(k) with the energy level $E_r(k)$ of the reverberation component of the sub-band signal c(k). In the illustrated embodiment this can be represented mathematically as:

$$E_{ds}(k) = M_{dse}(k) \cdot E_{pri}(k)$$

where $M_{dse}(k)$ is a binary mask computed as $M_{dse} = 1$ if DLRR (k) is greater than a predetermined threshold value and energy level $E_{pri}(k)$ of the sub-band signal c(k) is greater than the energy level $E_r(k)$ of the reverberation component of the sub-band signal c(k). Otherwise the value of the $M_{dse}(k)$ is small (e.g. close to or equal to zero).

The energy level $E_r(k)$ of the reverberation component can be derived by mapping the noncorrelation signal $E_{null}(k)$ back to the domain of the energy level $E_{pri}(k)$ of the sub-band signal c(k). This can be represented mathematically as:

$$E_r(k) = [1 + X_{ps}(k) * X_{ps}(k)] \cdot E_{null}(k)$$

The speech component energy $E_{ds}(k)$ is then converted to the logarithmic domain by log module 424. The output of the log module 424 is then passed to temporal filter module 432 for estimating the filter parameters of the temporal filters via adder 426.

As shown in FIG. 4, the temporal filter module 432 filters the log domain of the energy level $E_{pri}(k)$ of the sub-band signal c(k) as output by log module 428. In the illustrated embodiment, a temporal filter is applied independently to each sub-band, and consists of a finite impulse response (FIR) filter adapted using the normalized least mean squares (NLMS) algorithm. As a result, the temporal filters can be adapted relatively slowly, such that the degradation due to the reverberation component can be taken into consideration. The filtered output is then provided to adaptive equalizer (AEQ) module 434.

The operation performed by the temporal filter module 432 may result in overshoot or undershoot of the energy envelopes. As a result, the adaptive equalizer module 434 computes a gain value indicating the difference between the energy levels at the input and output of the temporal filter module 432. This gain value is then combined with the output of the temporal filter module 432 via adder 436 to equalize the output to compensate for this energy level difference.

In the illustrated embodiment the adaptive equalizer module 434 is implemented by subtracting (in the log domain) the outputs of two energy-peak trackers. One energy-peak tracker tracks the input to the temporal filter module 432 and one energy-peak tracker tracks the output of the temporal filter module 432.

The equalized output of the adder 436 is then expanded by exponential operator 438. The expanded result $E_{tf}(k)$ is then used by dereverb mask computation module 440 to compute the dereverb mask $M_{drv}(k)$. In this illustrated embodiment, the dereverb mask $M_{drv}(k)$ is computed as:

$$M_{drv}(k) = \text{sqrt}(E_{tf}(k)/E_{pri}(k))$$

To limit the value of the dereverb mask $M_{drv}(k)$, the dereverb mask computation module 440 may lower bound the value of the dereverb mask $M_{drv}(k)$ based on an estimated energy of the noise floor provided by noise floor module 430. In some embodiments, the dereverb mask $M_{drv}(k)$ may also be controlled via an application program interface (API) 450.

Figure 5:
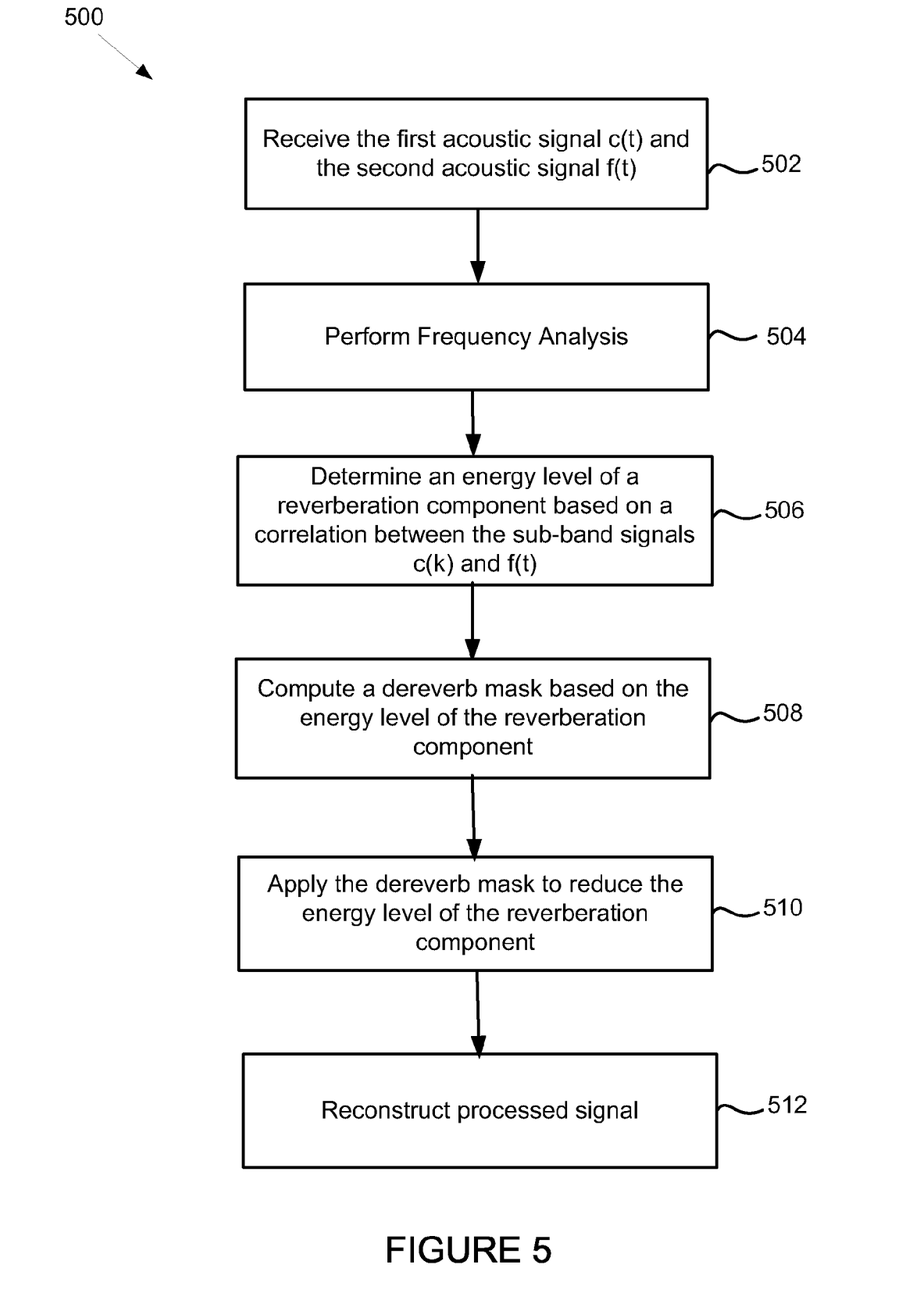
FIG. 5 is a flow chart of an exemplary method for reducing reverberation within an acoustic signal.

FIG. 5 is a flow chart of an exemplary method 500 for reducing reverberation within an acoustic signal as described herein. In some embodiments the steps may be combined, performed in parallel, or performed in a different order. The method 500 of FIG. 5 may also include additional or fewer steps than those illustrated.

In step 502, the first acoustic signal c(t) is received via the primary microphone 106 and the second acoustic signal f(t) is received via the secondary microphone 108. In exemplary embodiments, the acoustic signals are converted to digital format for processing.

In step 504, frequency analysis is then performed on the acoustic signals c(t) and f(t) to form sub-band signals c(k) and f(k). In step 506, the energy level of a reverberation component in the sub-band signals c(k) is determined based on the correlation between the sub-band signals c(k) and f(k).

In step 508, the dereverb mask is computed based on the determined energy level of the reverberation component. In step 510, the dereverb mask is applied to the sub-band signals c(k) to reduce the energy level of the reverberation component.

The processed signals which are generated from applying the dereverb mask are reconstructed at step 512. Signal reconstruction may be performed by reconstructor module 340, and the resulting reconstructed signal may be output by receiver 200 to communication network 114.

As used herein, a given signal, event or value is "based on" a predecessor signal, event or value if the predecessor signal, event or value influenced the given signal, event or value. If there is an intervening processing element, step or time period, the given signal can still be "based on" the predecessor signal, event or value. If the intervening processing element or step combines more than one signal, event or value, the output of the processing element or step is considered to be "based on" each of the signal, event or value inputs. If the given signal, event or value is the same as the predecessor signal, event or value, this is merely a degenerate case in which the given signal, event or value is still considered to be "based on" the predecessor signal, event or value. "Dependency" on a given signal, event or value upon another signal, event or value is defined similarly.

The above described modules may be comprised of instructions that are stored in a storage media such as a machine readable medium (e.g., computer readable medium). These instructions may be retrieved and executed by a processor. Some examples of instructions include software, program code, and firmware. Some examples of storage media comprise memory devices and integrated circuits. The instructions are operational.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for reducing reverberation within an acoustic signal, the method comprising:
    receiving a first acoustic signal and a second acoustic signal;
    separating the first acoustic signal into first acoustic sub-band signals and separating the second acoustic signal into second acoustic sub-band signals;
    determining an energy level of reverberation components in the first acoustic sub-band signals based on a correlation between the first and second acoustic sub-band signals;
    determining an energy level of speech components in the first acoustic sub-band signals based on the determined energy level of the reverberation components, the determining the energy level of the speech components comprising forming a noncorrelation signal by suppressing a portion of each of the first acoustic sub-band signals correlated with the second acoustic sub-band signals, the noncorrelation signal indicating the energy level of the reverberation components;
    determining a signal modification, comprising:
        determining an energy level of each of the first acoustic sub-band signals; and
        applying a temporal filter to the determined energy level of each of the first acoustic sub-band signals to form a filtered sub-band signal, filter parameters of the temporal filter being based on the determined energy level of the speech components in the first acoustic sub-band signals, the signal modification based on the filtered sub-band signal; and
    applying the signal modification to the first acoustic sub-band signals to reduce the energy level of the reverberation components, the signal modification further being based on the determined energy level of the reverberation components and the determined energy level of the speech components, wherein determining the energy level of the reverberation component and applying the signal modification are performed on a per sub-band signal basis for the first and second acoustic sub-band signals.

2. The method of claim 1, wherein determining the energy level of the speech components further comprises:
    forming a correlation signal based on the portions of the first acoustic sub-band signals correlated with the second acoustic sub-band signals; and
    determining the energy level of the speech components based on a difference between the noncorrelation signal and the correlation signal.

3. The method of claim 1, wherein the signal modification is further based on a determined energy level of noise components in the first acoustic sub-band signals, and applying the signal modification to the first acoustic sub-band signals reduces the energy level of the noise components.

4. The method of claim 1, further comprising computing a gain value based on the filtered sub-band signal and combining the gain value with the filtered sub-band signal before applying the signal modification.

5. The method of claim 1, wherein the temporal filter is adapted in the logarithmic domain.

6. A non-transitory computer readable storage medium having embodied thereon a program, the program being executable by a processor to perform a method for reducing reverberation within an acoustic signal, the method comprising:
    receiving a first acoustic signal and a second acoustic signal;
    separating the first acoustic signal into first acoustic sub-band signals and separating the second acoustic signal into second acoustic sub-band signals;
    determining an energy level of reverberation components in the first acoustic sub-band signals based on a correlation between the first and second acoustic sub-band signals;
    determining an energy level of speech components in the first acoustic sub-band signals based on the determined energy level of the reverberation components, the determining the energy level of the speech components comprising forming a noncorrelation signal by suppressing a portion of each of the first acoustic sub-band signals correlated with the second acoustic sub-band signals, the noncorrelation signal indicating the energy level of the reverberation components;
    determining a signal modification, comprising:
        determining an energy level of each of the first acoustic sub-band signals; and
        applying a temporal filter to the determined energy level of the first acoustic sub-band signals to form a filtered sub-band signal, filter parameters of the temporal filter based on the determined energy level of the speech components in the first acoustic sub-band signals, the signal modification based on the filtered sub-band signal; and
    applying the signal modification to the first acoustic sub-band signals to reduce the energy level of the reverberation components, the signal modification further being based on the determined energy level of the reverberation components and the determined energy level of the speech components, wherein determining the energy level of the reverberation component and applying the signal modification are performed on a per sub-band signal basis for the first and second acoustic sub-band signals.

7. The non-transitory computer readable storage medium of claim 6, wherein determining the energy level of the speech components further comprises:
   forming a correlation signal based on the portions of the first acoustic sub-band signals correlated with the second acoustic sub-band signals; and
   determining the energy level of the speech components based on a difference between the noncorrelation signal and the correlation signal.

8. The non-transitory computer readable storage medium of claim 6, wherein the signal modification is further based on a determined energy level of noise components in the first acoustic sub-band signals, and applying the signal modification to the first acoustic sub-band signals reduces the energy level of the noise components.

9. The non-transitory computer readable storage medium of claim 6, the method further comprising computing a gain value based on the filtered sub-band signal and combining the gain value with the filtered sub-band signal before applying the signal modification.

10. The non-transitory computer readable storage medium of claim 6, wherein the temporal filter is adapted in the logarithmic domain.

11. A system for reducing reverberation within an acoustic signal, the system comprising:
   a first microphone to receive a first acoustic signal;
   a second microphone to receive a second acoustic signal; and
   a processor to execute an audio processing module to:
      separate the first acoustic signal into first acoustic sub-band signals and separate the second acoustic signal into second acoustic sub-band signals;
      determine an energy level of reverberation components in the first acoustic sub-band signals based on a correlation between the first and second acoustic sub-band signals;
      determine an energy level of speech components in the first acoustic sub-band signals based on the determined energy level of the reverberation components, the determining the energy level of the speech components comprising forming a noncorrelation signal by suppressing a portion of each of the first acoustic sub-band signals correlated with the second acoustic sub-band signals, the noncorrelation signal indicating the energy level of the reverberation components;
      determine a signal modification, comprising:
         determining an energy level of each of the first acoustic sub-band signals; and
         applying a temporal filter to the determined energy level of each of the first acoustic sub-band signals to form a filtered sub-band signal, filter parameters of the temporal filter based on the determined energy level of the speech components in the first acoustic sub-band signals, the signal modification based on the filtered sub-band signal; and
      apply the signal modification to the first acoustic sub-band signals to reduce the energy level of the reverberation components, the signal modification further being based on the determined energy level of the reverberation components and the determined energy level of the speech components, wherein determining the energy level of the reverberation components and applying the signal modification are performed on a per sub-band signal basis for the first and second acoustic sub-band signals.

12. The system of claim 11, wherein determining the energy level of the speech components further comprises:
   forming a correlation signal based on the portions of the first acoustic sub-band signals correlated with the second acoustic sub-band signals; and
   determining the energy level of the speech components based on a difference between the noncorrelation signal and the correlation signal.

13. The system of claim 11, wherein the signal modification is further based on a determined energy level of noise components in the first acoustic sub-band signals, and applying the signal modification to the first acoustic sub-band signals by the audio processing module reduces the energy level of the noise components.

14. The system of claim 11, the audio processing module further computing a gain value based on the filtered sub-band signal and combining the gain value with the filtered sub-band signal before applying the signal modification.

15. The system of claim 11, wherein the temporal filter is adapted in the logarithmic domain.

* * * * *